(12) United States Patent
Akahori (10) Patent No.: US 6,243,429 B1
(45) Date of Patent: Jun. 5, 2001

(54) DATA DEMODULATOR FOR CORRECTING BIT ERRORS

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/526,489

(22) Filed: Mar. 15, 2000

(30) Foreign Application Priority Data

Mar. 18, 1999 (JP) .................................................. 11-073005

(51) Int. Cl.[7] .................................................. H04L 27/06
(52) U.S. Cl. .......................................... 375/340; 329/311
(58) Field of Search ................................... 375/324, 316, 375/340; 329/311, 313, 318, 319; 714/48

(56) References Cited

U.S. PATENT DOCUMENTS 6,046,630 * 4/2000 Kim ...................... 329/304

* cited by examiner

Primary Examiner—Temesghen Ghebretinsae

(74) Attorney, Agent, or Firm—Venable; Robert J. Frank; Michael A. Sartori (57) ABSTRACT

A data demodulator includes a first decision circuit for demodulating a received signal to thereby output a first digital signal. A baseband circuit converts the first digital signal to a baseband signal lying in the same frequency band as the received signal. A code processing signal generator has a data rate substantially equal to one-half of the data rate of the received signal, and generates a code processing signal whose transition point is coincident with every two-bit transition point of the received signal. A first mixer superposes the code processing signal on the baseband signal. A second mixer superposes the output of the first mixer on the received signal input to the first decision circuit to thereby demodulate the received signal by spreading. As a result, a noise component superposed on the received signal is spread. A filter has a pass band narrower than the frequency band of the received signal for separating a signal component corresponding to the code processing signal from the output of the second mixer. A second decision circuit demodulates the output of the filter to thereby output a signal forbit error decision. A correction circuit compares the code processing signal and the signal output from the second decision circuit to thereby locate a portion of the first digital signal where a bit error exists, and corrects the bit error to thereby output a second digital signal.

6 Claims, 9 Drawing Sheets

Fig. 9

DATA DEMODULATOR FOR CORRECTING BIT ERRORS

BACKGROUND OF THE INVENTION

1. Field of the Invention

The present invention relates to a data demodulator and more particularly to a data demodulator feasible for a receiver included in a digital radio communication apparatus.

2. Description of the Background Art

Generally, a digital radio communication apparatus using, e.g., a PSK (Pulse Shift Keying) modulation system includes a receiver for receiving a radio wave with an antenna. A radio wave coming in through the antenna is input to a first or front end band-pass filter for removing spurious signal components. The band-pass filter has its output connected to a mixer, which is adapted to multiply the output of the band-pass filter by a preselected frequency signal. The mixer has its output connected to a decision circuit, which is adapted to convert the resulting output of the mixer to an IF (Intermediate Frequency) signal that can be demodulated. The IF signal is fed to a second band-pass filter so as to further reduce noise components, i.e., to increase the ratio of a necessary modulated component to the entire signal. The second band-pass filter has its output connected to a decision circuit, which is adapted to demodulate the output of the second band-pass filter to thereby output a demodulated digital signal. The decision circuit may be adapted to use synchronous detection, delay detection or similar conventional technology detection scheme.

Figure 1A:
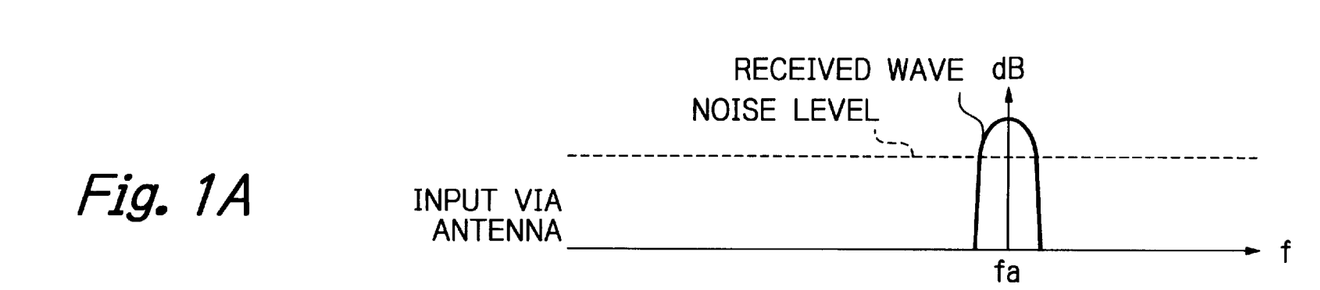
FIGS. 1A through 1D show the frequency spectra of the signal components output from circuit elements included in a conventional receiver and the noise components contained therein.
Figures 1B, 1C:
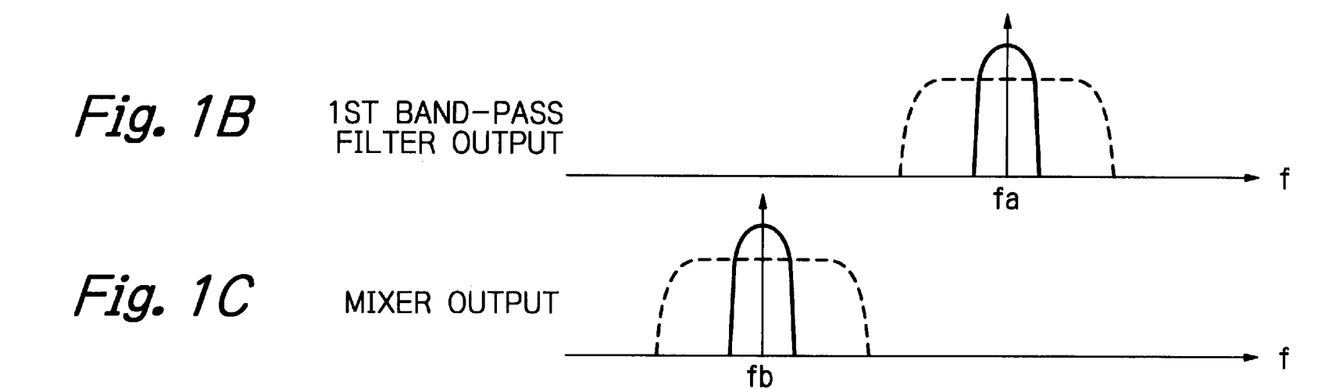
Figure 1D:
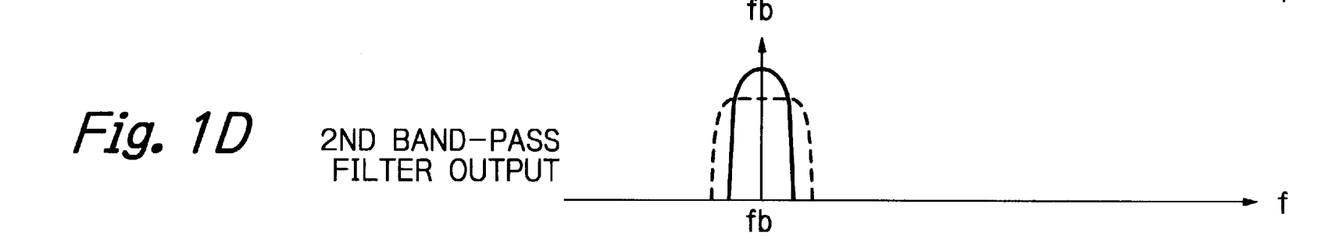

FIG. 1A shows the frequency spectrum of a specific modulated wave received via the antenna. FIGS. 1B, 1C and 1D respectively show the outputs of the first band-pass filter, the mixer, and the second band-pass filter in frequency spectrum.

The receiving ability of the above-described receiver depends not only on the detection system and circuit arrangement of the decision circuit, but also on the characteristic of the second band-pass filter expected to attenuate noise outside of a frequency band assigned thereto. It is generally ideal for the second band-pass filter, if provided with, e.g., a Nyquist filter characteristic, to be adapted to pass a modulated component only with the remaining frequency components filtered out, along with its fidelity.

Figure 2A:
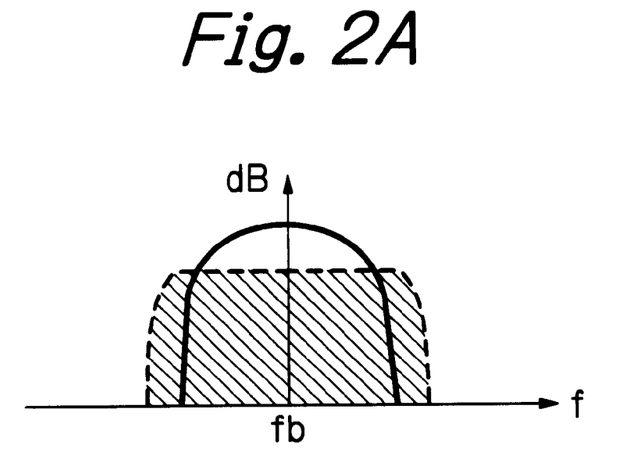
FIGS. 2A and 2B respectively show an ordinary band-pass filter characteristic and an ideal noise cancellation characteristic available with a conventional band-pass filer.
Figure 2B:
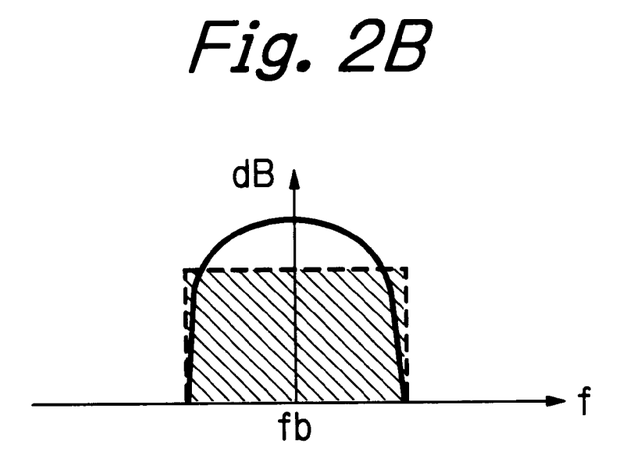

The problem with the above-described conventional receiver will be described specifically with reference to FIGS. 2A and 2B. FIGS. 2A and 2B respectively show an ordinary band-pass filter characteristic and an ideal band-pass filter characteristic available with the conventional system. The receiver would be able to cancel all noise components ascribable to spurious frequency components if provided with an ideal band-pass filter. However, as shown in FIG. 2B, even that receiver cannot cancel a noise component superposed on the pass band of the filter. A bit error rate is determined by a power ratio between the signal component and the noise component that cannot be cancelled. While the bit error rate depends on the modulation system, the conventional demodulation system cannot reduce the noise component contained in the frequency band of the demodulated wave, and is therefore unable to realize a receiver characteristic superior to the theoretical value of any one of the modulation systems.

SUMMARY OF THE INVENTION

It is therefore an object of the present invention to provide a data demodulator capable of accurately locating and correcting an error included in the result of decision and therefore promoting accurate demodulation.

A data demodulator in accordance with the present invention includes a first decision circuit for demodulating a received signal to thereby output a first digital signal. A baseband circuit converts the first digital signal to abaseband signal lying in the same frequency band as the received signal. A code processing signal generator has a data rate substantially equal to one-half of the data rate of the received signal, and generates a code processing signal whose transition point is coincident with every two-bit transition point of the received signal. A first mixer superposes the code processing signal on the baseband signal. A second mixer superposes the output of the first mixer on the received signal input to the first decision circuit to thereby demodulate the received signal by spreading. As a result, a noise component superposed on the received signal is spread. A filter has a pass band narrower than the frequency band of the received signal for separating a signal component corresponding to the code processing signal from the output of the second mixer. A second decision circuit demodulates the output of the filter to thereby output a signal for bit error decision. A correction circuit compares the code processing signal and the signal output from the second decision circuit to thereby locate a portion of the first digital signal where a bit error exists, and corrects the bit error to thereby output a second digital signal.

The data demodulator may be provided with a couple of signal processing paths each including the above circuit elements except for the correction circuit in order to further enhance accurate demodulation.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 3:
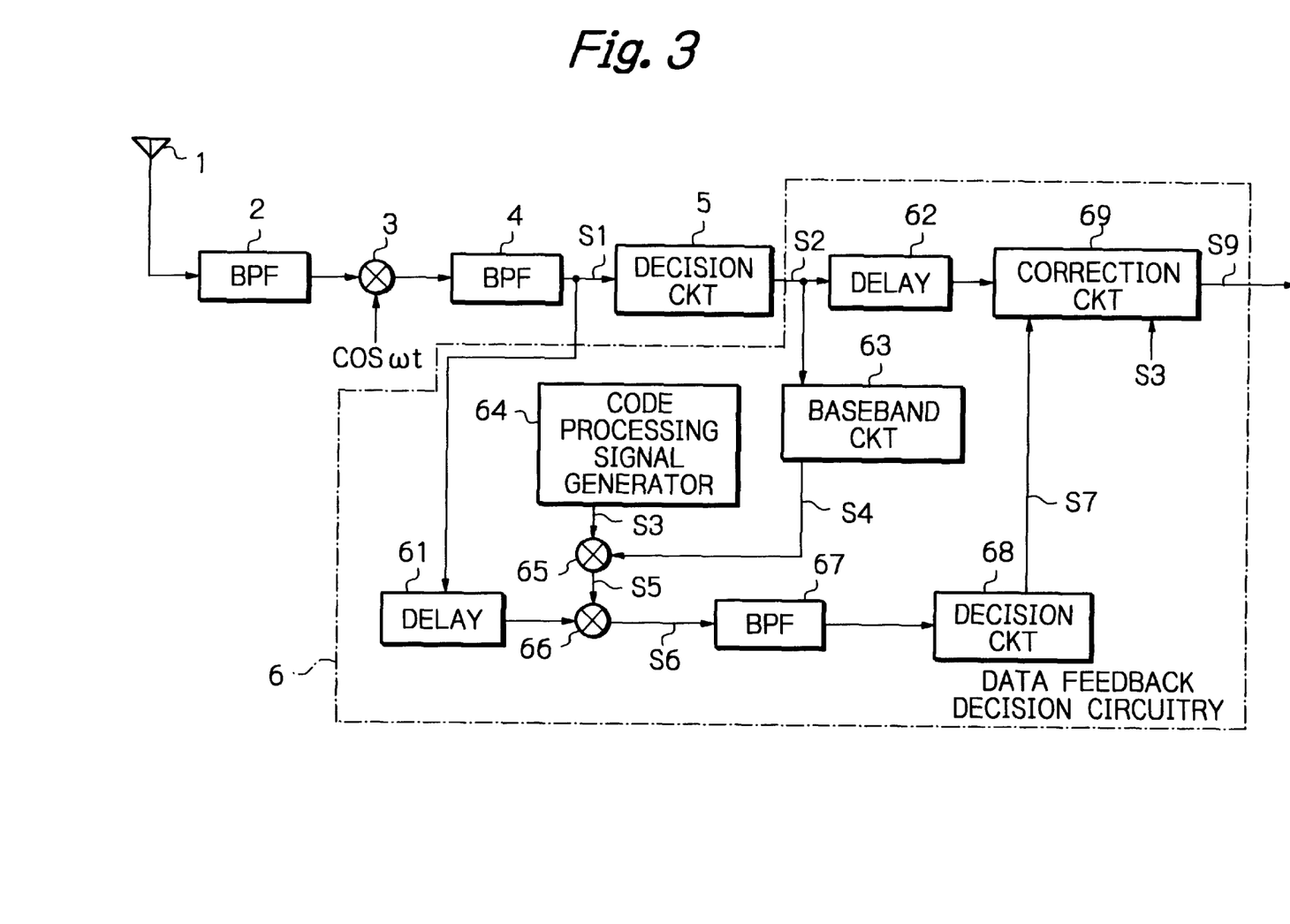
FIG. 3 is a block diagram schematically showing a preferred embodiment of the data demodulator in accordance with the present invention.

Referring to FIG. 3 of the drawings, a preferred embodiment of a data demodulator in accordance with the present invention includes data feedback decision circuitry 6 made up of two delays 61 and 62, a baseband circuit 63, a code processing signal generator 64, two mixers 65 and 66, a band-pass filter (BPF) 67, a decision circuit 68, and a correction circuit 69, which are interconnected as illustrated.

The band-pass filter 4 is adapted to output an intermediate frequency (IF) signal S1 and feed it to the delay 61, as will be described later specifically. The one delay 61 is adapted to absorb a time lag between the IF signal S1 and a signal S5 output from the mixer 65. The decision circuit 5 outputs a signal S2 and delivers it to the delay 62. The other delay 62 is adapted to absorb a time lag between the signal S2 and a signal S7 output from the decision circuit 68.

The baseband circuit 63 is adapted for converting the signal or received data S2 output from the decision circuit 5 to abaseband signal S4 corresponding thereto. It is to be noted that the baseband signal S4 has a substantially or almost ideal waveform substantially free from the influence of distortions.

The code processing signal generator 64 generates a code processing signal S3 synchronous to the output S2 of the decision circuit 5. In the code processing signal S3, a (logical) ONE and a (logical) ZERO repeatedly appear at a period which is substantially equal to one-half of the data rate of he output S2 of the decision circuit 5.

The mixer 65 multiplies the baseband signal S4, to which the received data S2 have been converted, by the code processing signal S3. The one mixer 65 therefore outputs a signal S5 having a waveform in which the baseband signal S4 is superposed on the code processing signal S3. The other mixer 66 multiplies the output of the delay 61, i.e., the delayed IF signal S1 with the signal S5 output from the one mixer 65 in order to effect spread demodulation. The mixer 66 delivers its output S6 to the band-pass filter 67.

The band-pass filter 67 removes from a noise component spread by the mixer 66 only the code signal processing component whose frequency band is substantially equal to one-half of the frequency band of the received wave.

The decision circuit 68 demodulates the output of the band-pass filter 67 to thereby output digital data. The decision circuit 68 may be implemented by any one of conventional circuit arrangements. If the result of decision output from the decision circuit, or first decision means, 5 is free from errors, a signal S7 output from the decision circuit 68 has the same waveform as the code processing signal S3.

The result of decision S7 output from the decision circuit 68 and the code processing signal S3 are input to the correction circuit 69 and compared thereby. If the two inputs S7 and S3 are substantially identical with each other, then the correction circuit 69 determines that the result of decision is correct. If the inputs S7 and S3 are not coincident with each other, the correction circuit 69 then determines that a decision error exists at a portion where they are not coincident. The correction circuit 69 then inverts the value of the corresponding bit of the received data S2 input from the decision circuit 5 via the delay 62, and delivers the corrected data on its output S9.

Figure 4:
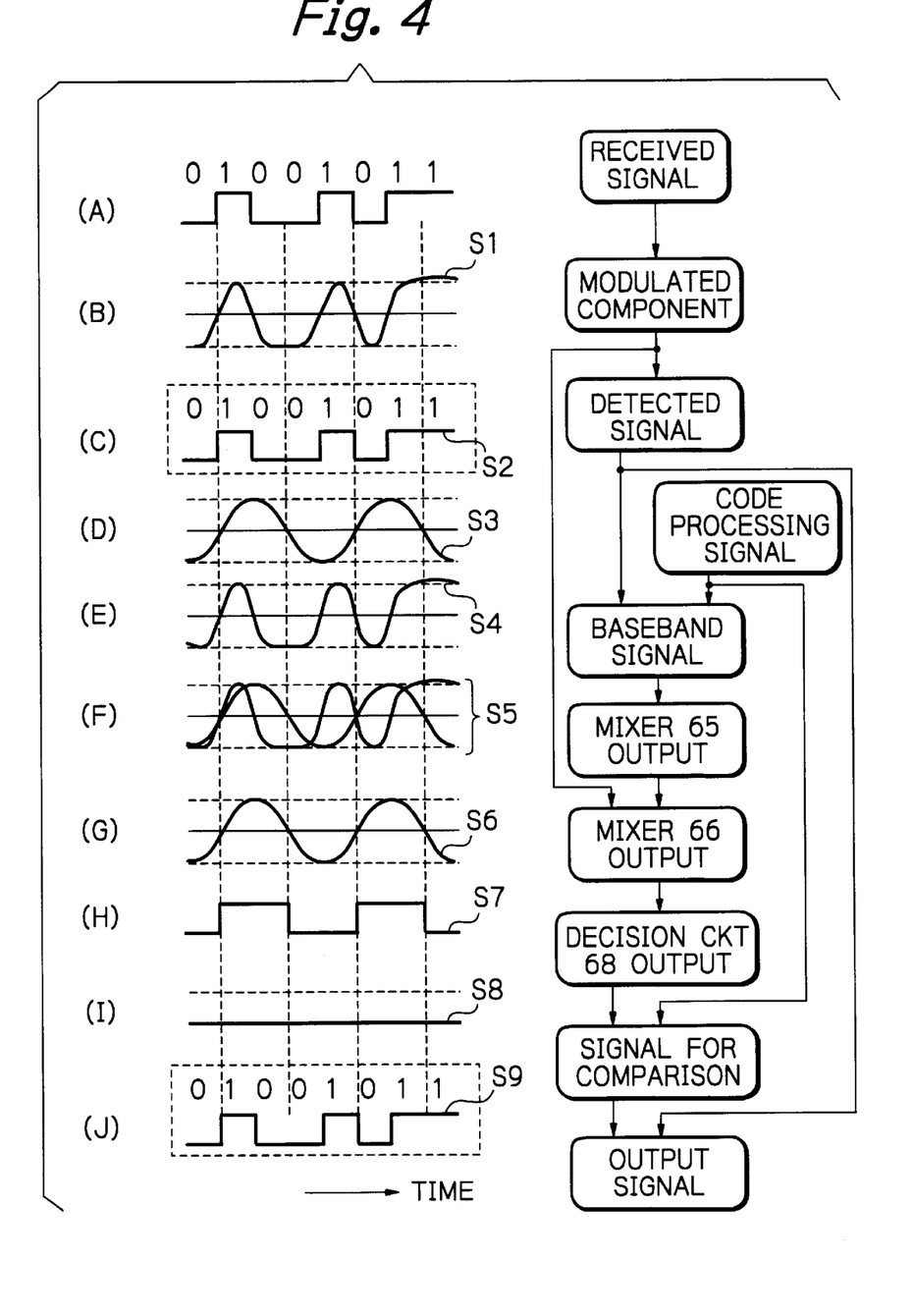
FIG. 4 demonstrates time charts in the left portion and a flow chart corresponding thereto in the right portion which are useful for understanding a specific operation of the illustrative embodiment performed when the result of decision does not include an error.
Figure 5:
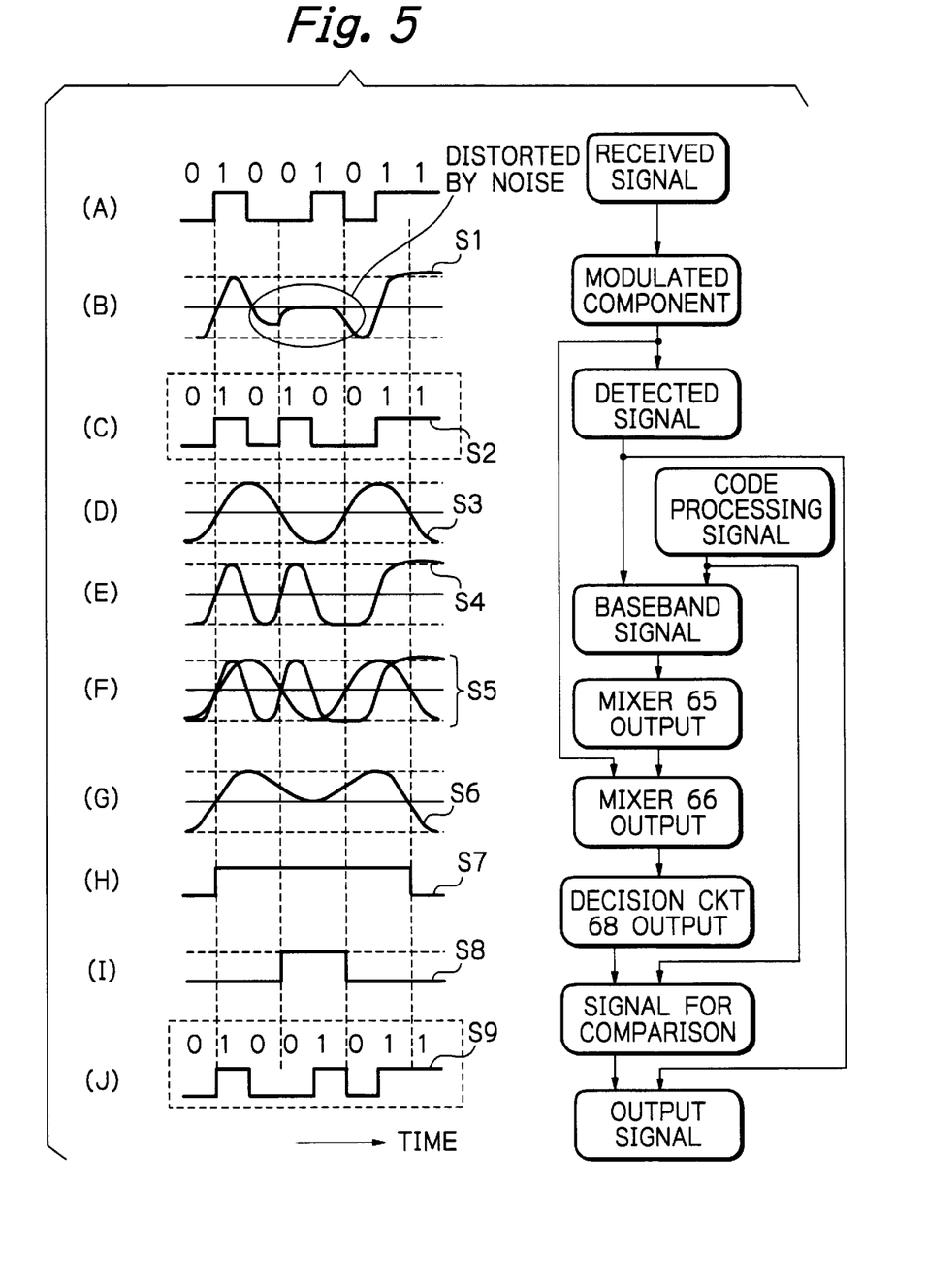
FIG. 5 demonstrates, similarly to FIG. 4, time charts in the left portion and a flow chart corresponding thereto in the right portion which are useful for understanding another specific operation of the illustrative embodiment performed when the result of decision includes an error.

Specific operations of the above-described data demodulator will be described hereinafter. FIGS. 4 and 5 respectively demonstrate, in the form of time charts and flow chart corresponding thereto, a specific operation to be performed when the result of decision output from the first decision circuit 5 is free from errors and a specific operation to be performed when it includes an error.

As shown in FIG. 3, a radio wave coming in through an antenna 1 is routed through a band-pass filter 2 and a mixer 3 and thereby transformed to an IF signal S1 which can be identified by the decision circuit 5. The IF signal S1 is applied to the decision circuit 5 and delay 61. The decision circuit 5 produces received data S2 from the IF signal S1. If the data feedback decision circuitry 6 of the illustrative embodiment were absent, then the output of the decision circuit 5 including an error would not be corrected. Specifically, as shown in FIG. 5, part (B), assume that the IF signal S1 is noticeably distorted due to the influence of a noise component. Then, as shown in FIG. 5, part (C), the output S2 of the decision circuit 5 is not identical with a transmitted signal shown in FIG. 5, part (A). Despite such an error, the output S2 of the decision circuit 5 would be output as a final result of decision.

The data feedback decision circuitry 6 unique to the illustrative embodiment is capable of detecting the above decision error of the decision circuit 5 and correcting it. The operation of the data feedback decision circuitry 6 will be described specifically hereinafter.

The IF signal S1 shown in FIG. 4, part (B) or FIG. 5, part (B) output from the band-pass filter 4 is input to one input of the mixer 66 via the delay 61. The delay 61 delays the IF signal S1 by a period of time necessary for the IF signal S1 to be determined by the decision circuit 5, converted to the baseband signal by the baseband circuit 63, multiplied by the code processing signal S3 by the mixer 65, and then input to the other input of the mixer 66.

More specifically, the decision circuit 5 delivers its output S2 representative of the result of decision, i.e., received data shown in FIG. 4, part (C), or FIG. 5 (C) to the baseband circuit 63. The baseband circuit 63 removes high frequency components from the received data S2 and thereby outputs a baseband signal component S4 shown in FIG. 4, part (E) or FIG. 5, part (E) whose frequency band is substantially identical with the receipt frequency band.

The mixer 65 multiplies the baseband signal S4 by the code processing signal S3 synchronous to the received data S2 and having binary ZEROs and ONEs repeatedly appearing at a period which is substantially equal to one-half of the data rate of the received data S2, as stated earlier. As a result, the baseband signal S4 is subjected to spread modulation, as shown in FIG. 4, part (F) or FIG. 5, part (F). In the output S5 of the mixer 65, the transition points of the received data S2 and those of the code processing signal S3 are coincident with each other. Consequently, the output S5 of the mixer 65 has a substantially ideal waveform estimated from the result of decision output from the decision circuit 5 and in which the IF signal S1 and code processing signal S3 are superposed on each other.

The mixer 66 multiplies the output S5 of the mixer 65 and the delayed IF signal output from the delay 61 and feeds the resulting product to the band-pass filter 67. That is, the mixer 66 combines the IF frequency component S1 output by simply varying the frequency of the received wave, the baseband signal S4 (corresponding to the received data S2) output form the mixer 65, and the code processing signal S3.

So long as the result of decision output from the decision circuit 5 is free from errors, the IF signal S1 shown in FIG. 4, part (B) and the baseband signal S4 shown in FIG. 4, part (E) (corresponding to the received data S2) are expected to be identical with each other. Therefore, if a decision error does not occur, the above two signals S1 and S4 cancel each other due to spread modulation. As a result, the mixer 66 outputs only the component corresponding to the code processing signal S3, as shown in FIG. 4, part (G).

While a noise component superposed on the IF band and input to the mixer 66 is spread by the band spreading effected by the output of the mixer 65, the total energy of noise does not change. The frequency band, however, is broadened by the data rate of the received data S1 and code processing signal S3 due to spreading.

The output S6 of the mixer 66 is input to the band-pass filter 67. The band-pass filter 67 is provided with a narrower pass band than the previous band-pass filter 4 in order to pass only the component corresponding to the code processing signal S3. Consequently, the energy of the noise component passed through the band-pass filter 67 is halved, compared to the time when it is output from the mixer 66. This is successful to relatively reduce the influence of the noise component on the desired signal.

The decision circuit 68 demodulates the code processing signal passed through the band-pass filter 67 and feeds the result of modulation S7, FIG. 4, part (H), to the correction circuit 69. It is noteworthy that the result of decision output from the decision circuit 68 is reliable because the influence of the noise component is reduced, as stated above.

The correction circuit 69 includes a comparator which is adapted to compare the output S7 of the decision circuit 68 with the code processing signal S3 input to the mixer 65, and outputs the result of comparison S8, FIG. 4, part (I) and FIG. 5, part (I). If the result of decision output from the decision circuit 5 is free from errors, only the component corresponding to the code processing signal S3 is input to the decision circuit 68, as stated earlier. In this case, the signals S7 and S3 input to the correction circuit 69 are identical with each other, so that the output S8 of the correction circuit 69 is flat, as shown in FIG. 4, part (I). Consequently, the correction circuit 69 determines that the decision made by the decision circuit 5 is correct, and directly outputs the received data S2 input from the decision circuit 5 via the delay 62 on its output S9, FIG. 4, part (J).

On the other hand, assume that the result of decision S2 output from the decision circuit 5 includes an error due to many noise components superposed on the IF signal S1. Then, the IF signal S1 shown in FIG. 5, part (B) and the baseband signal S4 (corresponding to the received data S2) shown in FIG. 5, part (E) are not coincident with each other. It follows that the signals S2 and S4 do not fully cancel each other despite the spread demodulation but cause a non-modulated signal component to remain in the output of the mixer 66, as shown in FIG. 5, art (G). As a result, the difference between the output S7 of the decision circuit 68 shown in FIG. 5, part (H) and the code processing signal S3 shown in FIG. 5, part (D) appears as a result of comparison S8, FIG. 5, part (I), in the correction circuit 69.

It is to be noted that the erroneous output of the decision circuit 68, which is a reliable circuit component, means that the received data S2 used as a spread code is erroneous and that the erroneous diffusion demodulation is executed by the code processing signal S3. It is therefore possible to determine whether or not the received data is correct by comparing the output S7 of the decision circuit 68 with the code processing signal S3.

The correction circuit 69 having obtained the result of comparison S8 shown in FIG. 5, part (I) outputs a correction signal for a position where an error has been detected (one bit in this specific case). The correction signal inverts the portion of the waveform of the received data S2 corresponding to the above-mentioned position, so that a corrected waveform S9 shown in FIG. 5, part (J) is output. The waveform S9 shown in FIG. 5, part (J) is identical with the original waveform shown in FIG. 5, part (A).

Figure 6A:
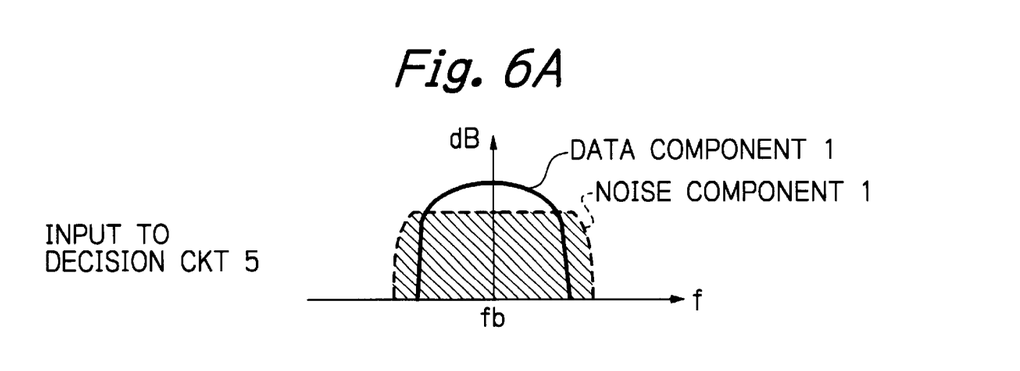
FIGS. 6A, 6B and 6C show the frequency characteristics useful for understanding an advantage achievable with the illustrative embodiment.
Figure 6B:
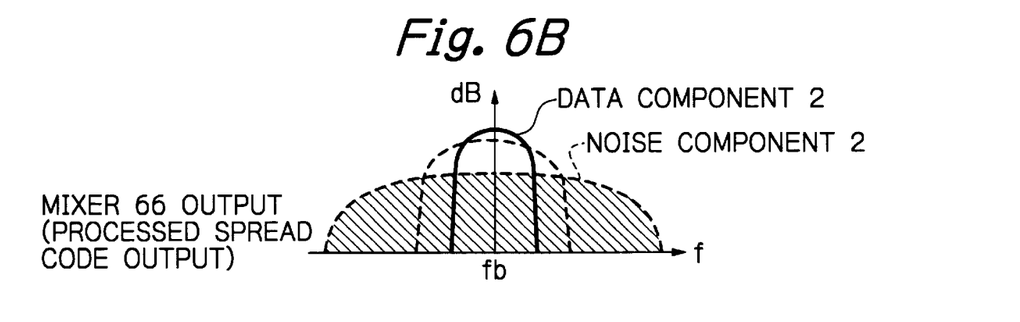
Figure 6C:
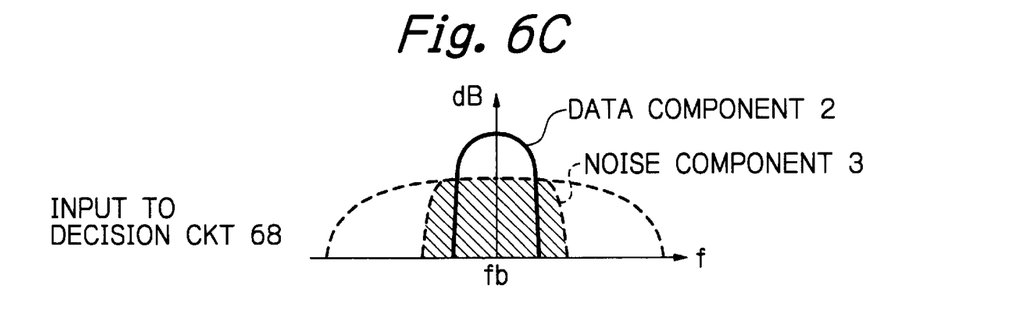

As stated above, in the illustrative embodiment, the decision circuit 68 demodulates a signal narrower in frequency band than a signal dealt with by the first-stage decision circuit 5. Stated another way, the band-pass filter 67 preceding the decision circuit 68 has a narrower pass band than the band-pass filter 4 preceding the decision circuit 5. Further, the signal input to the decision circuit 68 appears after the band spreading executed with the noise component passed through the band-pass filter 4, and has therefore the ratio of the noise energy to the desired signal reduced. It follows that more reliable information is achievable with the decision circuit 68 than with the decision circuit 5. This advantage will be readily understood when reference is made to FIGS. 6A, 6B and 6C. In FIGS. 6A, 6B and 6C, data components and noise components are compared in terms of power; a noise component 1 and data component 2 are equal to each other while a noise component 1 is equal to a noise component 2 which is greater than a noise component 3.

Therefore, when the output S7 of the reliable decision circuit 68 is not identical with the expected code processing signal S3, i.e., incorrect, it indicates that the received data S2 used as a spread code is erroneous and that erroneous spread demodulation is effected by the code processing signal S3. That is, whether or not the received data S2 is correct can be determined by comparing the output S7 of the decision circuit 68 with the code processing signal S3. When only one bit of the received data S2 is erroneous by way of example, one bit of impulse response S8 appears at the erroneous position, as shown in FIG. 5, part (I).

Consequently, when the correction circuit 69 detects an error in the output of the decision circuit 68, it can determine that two bits of the received data S2 corresponding to one bit of the code processing signal S3 are erroneous. The correction circuit 69 then inverts two bits of the error position of the received data S2 and outputs the resulting correct data. The illustrative embodiment is therefore capable of reducing the error rate to the extent lower than the conventional systems and thus insuring reliable communications.

Figure 7:
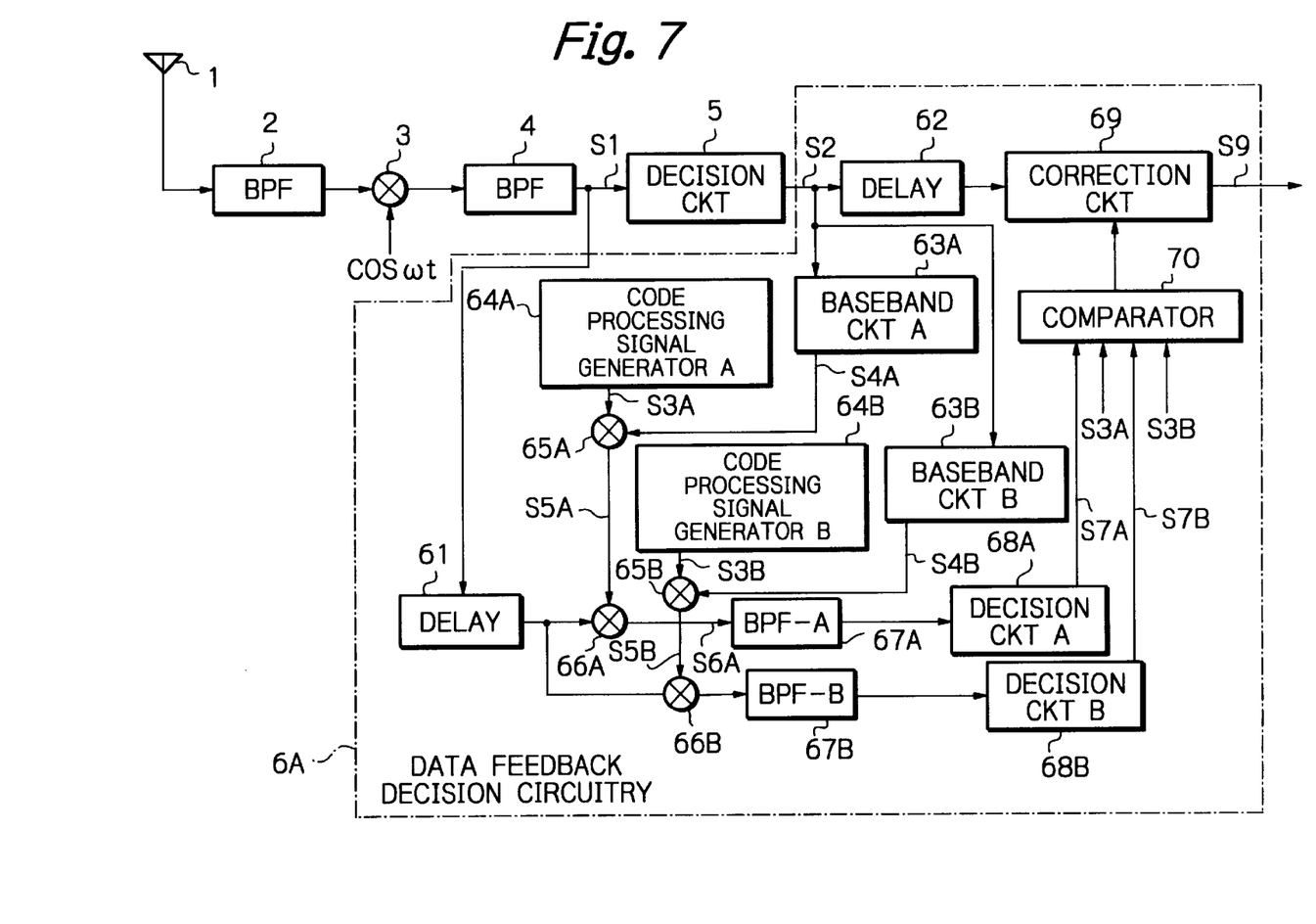
FIG. 7 is a block diagram, like FIG. 3, schematically showing an alternative embodiment of the present invention.

An alternative embodiment of the present invention constituting an improvement over the above-described embodiment will be described with reference to FIG. 7. The previous embodiment is effective only when two consecutive bits occurring in one period of the received data S2 are incorrect. This is because even when only one bit of the received data S2 is incorrect, the correction circuit 69 inverts not only the erroneous bit but also the other bit occurring in the same period. This renders the correction inaccurate and cannot reduce the error rate to a satisfactory degree. The alternative embodiment to be described implements a data demodulator capable of accurately correcting even one erroneous bit of received data occurring alone. In FIG. 7, the structural elements like those shown in FIG. 3 are designated by the identical reference numerals and will not be described specifically in order to avoid redundancy.

Figure 8:
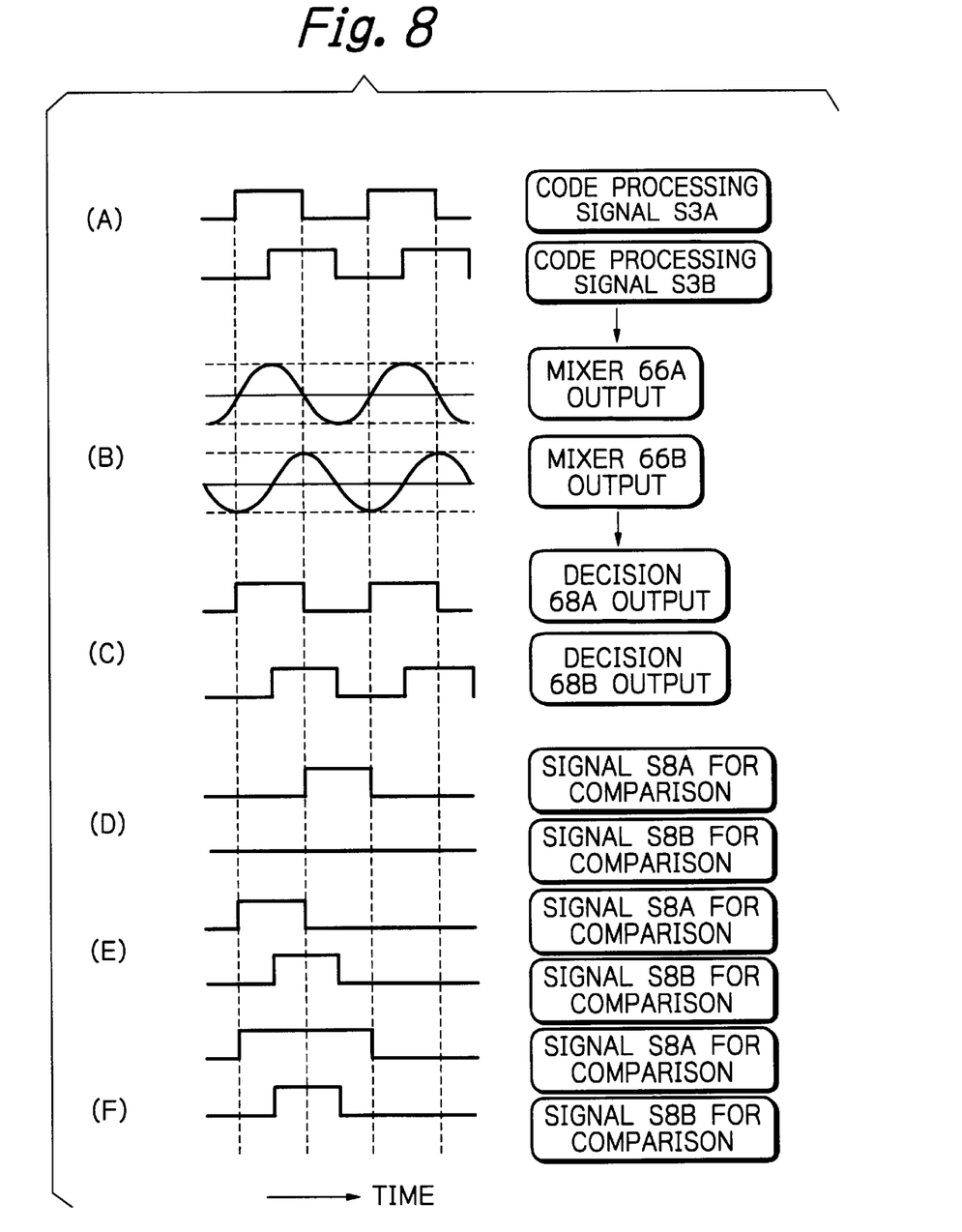
FIG. 8 demonstrates, similarly to FIG. 4, time charts in the left portion with a signal flow correspondingly in the right portion, useful for understanding the principle of operation of the alternative embodiment.

As shown in FIG. 7, the data demodulator includes data feedback decision circuitry 6A, which is similar to the circuitry 6 of the previous embodiment except for the following. To correct the received data S2 on a bit basis, as distinguished from the previous two-bit basis, the circuitry 6A has two signal paths, i.e., one path including a baseband circuit 63A, a code processing signal generator 64A, mixers 65A and 66A, a band-pass filter 67A and a decision circuit 68, and the other path including a baseband circuit 63B, a code processing signal generator 64B, mixers 65B and 66B, a band-pass filter 67B, and a decision circuit 68B. A comparator 70 is provided to compare signals 8A and 8B respectively derived from the above two paths, as will be described specifically later. In FIG. 8, signals similar to the signals of the previous embodiment are designated by identical reference numerals except for the addition of suffixes A and B.

Figure 9:
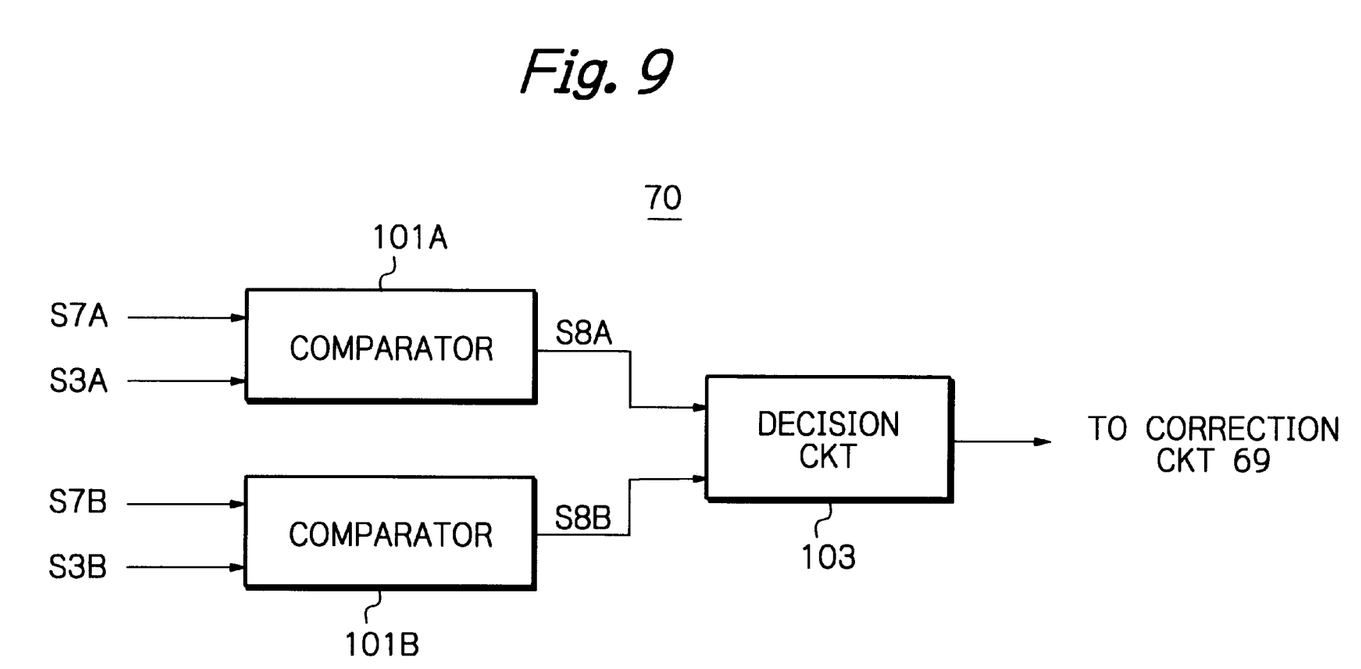
FIG. 9 schematically shows an embodiment of the comparator in the alternative embodiment shown in FIG. 7.

With reference to FIG. 9, the comparator 70 includes a couple of comparator subsections 101A and 101B each corresponding to the comparator, not shown, included in the correction circuit 69 of the previous embodiment, and a decision circuit 103 connected to the comparator subsections 101A and 101B, as shown specifically. The decision circuit is adapted to compare the signals 8A and 8B output from the two comparator subsections 101A and 101B, respectively, in order to detect an error, as will be described specifically later.

Reference will be made to FIG. 8 for describing a specific operation of the illustrative embodiment. As shown in FIG. 8, part (A), the code processing signal generators 64A and 64B respectively included in the two signal paths output code processing signals S3A and S3B having ONE/ZERO transition points shifted from each other by a period of time corresponding to one bit of the received data S2. Therefore, so long as the result of decision output from the decision circuit 5 is free from an error, the signals output from the mixers 66A and 66B are identical with each other except for the transition points of the code processing signals S3A and S3B. This is also true with the signals input to the decision circuits 68A and 58B.

The above relation in the individual signal path is identical with the relation of the single signal path of the previous embodiment. It follows that if the received data S2 demodulated by the decision circuit 5 is erroneous, the signals output from the decision circuits 68A and 68B are respectively different in waveform from the code processing signals S3A and S3B at the erroneous position, as in the previous embodiment. However, in the instant illustrative embodiment, the phases of the code processing signals S3A and S3B are shifted from each other by one bit period of the received data S2, i.e., by half a bit of the code processing signals S3A and S3B, as stated earlier. As a result, an error occurs in a particular manner in each of the signals output from the decision circuits 68A and 68B. For such path-by-path error detection, the comparator subsections 101A and 101B constituting the first stage of the comparator 70 respectively compare the outputs S7A and S7B of the decision circuits 68A and 68B with the code processing signals S3A and S3B.

More specifically, in the comparator 70, the resultant signals S8A and S8B, previously mentioned, are respectively output from the two comparator subsections 101A and 101B and input to the decision circuit 103. The decision circuit 103 makes decision under the following rule. It is to be noted that the decision circuit 103 causes the correction circuit 69 to correct the overlapping portions of the reversal periods of the comparator outputs S8A and S8B except when only one of the comparator outputs S8A and S8B is erroneous over one reversal period.

For example, as shown in FIG. 8, part (D), assume that only the signal S8A output from the decision circuit 68A is erroneous over a single reversal period. Then, the decision of the comparator 70 causes the correction circuit 69 to correct two bits of the received data S2 at the position where the above reversal period has appeared. This is also true when only the signal S8B is erroneous over a single reversal period.

As shown in FIG. 8, part (E), the signals 38A and 38B output from the decision circuits 68A and 68B, respectively, both are erroneous over a single inversion period due to a shift by one bit of the received data S2. Then, the decision of the comparator 70 causes the correction circuit 69 to invert only one bit of the received data S2 where the reversal periods of the signals 38A and 38B overlap each other.

Further, as shown in FIG. 8, part (F), assume that the signal 38A output from the decision circuit 68A is erroneous over two consecutive reversal periods while the signal 38B output from the decision circuit 68B is erroneous over a single reversal period. Then, the decision circuit 103 causes the correction circuit 69 to invert only two bits of the received data S2 where the reversal periods overlap each other. This is also true when the signal 38B is erroneous over two consecutive reversal periods while the signal 38A is erroneous over a single reversal period.

As stated above, the instant illustrative embodiment is capable of locating and correcting an erroneous portion not only when a decision error occurs over two consecutive bits, but also when it occurs over a single bit alone. This is successful to further enhance the reliability of communications.

While the illustrative embodiments have concentrated on a communications system, they are similarly applicable to broadcast systems using digital signals.

In summary, it will be seen that the present invention provides a data demodulator capable of accurately locating and correcting errors included in the result of decision and thereby outputting a more accurate result of demodulation.

The entire disclosure of Japanese patent application No. 73005/1999 filed Mar. 18, 1999 including the specification, claims, accompanying drawings and abstract of the disclosure is incorporated herein by reference in its entirely.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A data demodulator, comprising:
   a first decision circuit for demodulating a received signal to thereby output a first digital signal;
   a baseband circuit for converting the first digital signal to a baseband signal lying in a same frequency band as the received signal;
   a code processing signal generating circuit having a data rate which is substantially equal to one-half of a data rate of the received signal, for generating a code processing signal whose transition point is coincident with every two-bit transition point of the received signal;
   a first mixer for superposing the code processing signal on the baseband signal;
   a second mixer for superposing an output of said first mixer on the received signal input to said first decision circuit to thereby demodulate the received signal by spreading, whereby a noise component superposed on the received signal is spread;

a filter having a pass band narrower than the frequency band of the received signal for separating a signal component corresponding to the code processing signal from an output of said second mixer;

a second decision circuit for demodulating an output of said filter to thereby output a signal for bit error decision; and a correction circuit for comparing the code processing signal and the signal output from said second decision circuit to thereby locate a portion of the first digital signal where a bit error exists, and correcting the bit error to thereby output a second digital signal.

2. A demodulator in accordance with claim 1, further comprising a first delay circuit for delaying the received signal to thereby input a delayed received data to said second mixer.

3. A demodulator in accordance with claim 1, further comprising a second delay circuit for delaying the first digital signal to thereby input a delayed digital signal to said correction circuit.

4. A data demodulator, comprising:

a first decision circuit for demodulating a received signal to thereby output a first digital signal;

a first and a second signal processing path respectively using code processing signals shifted in phase from each other by one bit of the received signal, and each comprising:

a baseband circuit for converting the first digital signal to a baseband signal lying in a same frequency band as the received signal;

a code processing signal generating circuit having a data rate which is substantially equal to one-half of a data rate of the received signal, for generating a code processing signal whose transition point is coincident with every two-bit transition point of the received signal;

a first mixer for superposing the code processing signal on the baseband signal;

a second mixer for superposing an output of said first mixer on the received signal input to said first decision circuit to thereby demodulate the received signal by spreading, whereby a noise component superposed on the received signal is spread;

a filter having a pass band narrower than the frequency band of the received signal for separating a signal component corresponding to the code processing signal from an output of said second mixer; and     a second decision circuit for demodulating an output of said filter to thereby output a signal for bit error decision; and a correction circuit for comparing signals respectively output from said first and second signal processing paths for bit error decision and the code processing signals respectively assigned to said first and second signal processing paths on the basis of a result of comparison, locating a portion of the first digital signal where a bit error exists, and correcting the bit error to thereby output a second digital signal.

5. A demodulator in accordance with claim 4, further comprising a first delay circuit for delaying the received signal to thereby input a delayed received data to said second mixer of each of said first and second signal processing paths.

6. A demodulator in accordance with claim 4, further comprising a second delay circuit for delaying the first digital signal to thereby input a delayed digital signal to said correction circuit.

* * * * *